(12) United States Patent
Henderson et al.

(10) Patent No.: US 6,434,584 B1
(45) Date of Patent: Aug. 13, 2002

(54) FLEXIBLE ACCUMULATOR REGISTER FILE FOR USE IN HIGH PERFORMANCE MICROPROCESSORS

(75) Inventors: Alva Henderson, Sherman; Francesco Cavaliere, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/335,356

(22) Filed: Jun. 17, 1999

Related U.S. Application Data

(60) Provisional application No. 60/090,671, filed on Jun. 25, 1998, provisional application No. 60/089,572, filed on Jun. 17, 1998, and provisional application No. 60/087,957, filed on Jun. 4, 1998.

(51) Int. Cl.[7] .............................. G06F 7/38; G06F 7/52
(52) U.S. Cl. ........................................ 708/490; 708/625
(58) Field of Search ................................. 708/490, 625

(56) References Cited

U.S. PATENT DOCUMENTS

| | | | | |
|---|---|---|---|---|
| 4,754,421 A | * | 6/1988 | Bosshart | ...................... 708/625 |
| 4,809,212 A | * | 2/1989 | New et al. | ................... 708/625 |
| 5,363,322 A | * | 11/1994 | Gergen et al. | ............... 708/490 |
| 5,561,810 A | * | 10/1996 | Ohtomo | ....................... 708/490 |
| 6,233,597 B1 | * | 5/2001 | Tanoue et al. | ............... 708/625 |

OTHER PUBLICATIONS

US 5,822,234, 10/1998, Glass et al. (withdrawn)*

* cited by examiner

*Primary Examiner*—Tan V. Mai
(74) *Attorney, Agent, or Firm*—Robert B. Marshall, Jr.; W. James Brady, III; Frederick J. Telecky, Jr.

(57) ABSTRACT

Specialized microprocessor hardware 10 and a specialized instruction set that provides efficient data processing operations on long word length or bit length data. Instructions that manipulate data include a reserved bit-switch (in the form of a two bit field) whose status (A0) causes the instruction to be executed once to operate on a single word of data, or whose status (A0S) causes the instruction to be repeatedly executed as the instruction operates on a chain or list of sequential data, for example a data chain including N 16-bit words of data, wherein N is an integer. Every instruction word that manipulates data has a reserved bit switch that will cause the instruction to be executed either once operating on single word data or as a repeated execution of the same instruction operating on a chain or list of sequential data (n words).

4 Claims, 8 Drawing Sheets

FLEXIBLE ACCUMULATOR REGISTER FILE FOR USE IN HIGH PERFORMANCE MICROPROCESSORS

This application claims priority under 35 USC § 119 (e) (1) of Provisional Application Nos. 60/090,671, filed Jun. 25, 1998, 60/087,957 filed Jun.4, 1998 and 60/089,572 filed Jun. 17, 1998.

BACKGROUND AND SUMMARY OF THE INVENTION

This invention relates to the field of electronic data processing, and more specifically to the field of the electronic data processing of data having a long bit-length, i.e. data chains.

1. Background: Microprocessor Operation

Microprocessors are often required to manipulate binary data having wide ranges of bit lengths, for example data that ranges from a single logic bit to high precision arithmetic operations involving data that may be more than 128 bits in length.

Hardware arithmetic and logic units (ALUs) within microprocessors are generally constructed and arranged to handle fixed bit or word lengths. As a result, high precision arithmetic operations require multiple program steps and multiple microprocessor cycles. These data processing conditions lead to programs that are inefficient in terms of execution time, and lead to programming code inefficiency because the microprocessor hardware and the supporting program instruction set are not optimized for operating on data having a wide range of bit lengths, for example data that is represented by sequential chains of 16-bit data words.

For instructions such as addition and subtraction, this inefficiency results from memory thrashing involving memory stores and memory loads, as well as from program or software loop control overhead. For more complex instructions or operations such as multiplication and operations involving extended precision algorithms the result is even more inefficient. In addition, the negative, the positive, or the zero status of a resulting calculation value must be handled separately for multi-word calculations, thus requiring even more time and more program code.

2. Background: Accumulator Architecture

The accumulator is a central register for all processors, and is used to temporarily store the results of the ALU in a digital processor. In single data bus, single data memory designs, as in most general purpose microprocessors, the accumulator represents a bottleneck to high speed processing. The accumulator is used as both an input operand source and is used to latch the output operand of the ALU. Therefore, as different data values are manipulated, the prior results must be stored to some other register or memory before processing the next data. Frequently data in the accumulator is temporary but must be saved temporarily to make room for an intermediate calculation or operation and additional cycles must be used to retrieve the saved value before proceeding. Several cycles of unwanted execution time frequently must be wasted to satisfy these requirements. These wasted cycles are critical to execution time sensitive routines such as signal processing; saving two cycles every 8 is equivalent to 33% increase in processor speed.

Also, another problem that frequently occurs in common processors is that the single accumulator register requires the accumulator to be used both as the source for one input operand and the destination for output operand of the ALU. An example is addition, where 1 word in memory is added to one word in the accumulator, the results of which are written over the input operand originally stored in the accumulator. Two accumulator designs offer some feature for non-destructive operations, but give advantage only to single word width operations.

3. Background: Chain Processing

It is known that prior microprocessors have included the capability of operating on chains, for example by repeating a given instruction a prescribed number of times. It is also known that a repeat add with carry with data memory address post modification will effectively execute a chain operation. It is also known that others have used fixed hardware multipliers to do extended precision multiplies by using a multiply-by-parts algorithm, this being both complex and inefficient.

Microprocessors typically must manipulate data which has a wide range of bit length. This varies from single logic bit to high precision arithmetic requiring more than 128 bits. Arithmetic Logic units (ALUs) tare fixed word width and must manipulate high precision operations with multiple program steps. The programs become inefficient in terms of execution time and programming code efficiency because the basic hardware and supporting instruction set are not optimized for operating on wide data represented by a sequential chain of data words. For simple instructions like addition, subtraction, etc., this inefficiency results from memory thrashing (store and loads from memory) and software loop control overhead. For more complex operations like multiplication, the algorithms for extended precision are much more involved and inefficient. In addition, status of the resulting value (negative, positive, equal to zero) must be handled separately for multi word calculations, requiring even more time and program code.

It is known that an accumulator performs the function of a central register in a microprocessor, and that the accumulator is used to store the results of an ALU operation. In microprocessors having a single data bus and a single data memory, the accumulator represents a bottleneck to high speed processing.

More generally, a processor's accumulator is generally used as an input-operand source, and it is also used to latch the operand that is currently in the ALU. Therefore, as different data values are manipulated, the prior results must be stored to another register, or to memory, before processing of the next data can occur. Frequently, the data that is in the accumulator is temporary data that must be temporarily saved in order to make room for an intermediate calculation or operation, and additional cycles must be used to retrieve the saved temporary data before processing can continue. As a result, several cycles of execution time must be wasted. These wasted cycles are critical to time sensitive signal processing routines.

In addition, when a single accumulator is present, the accumulator must be used both as the source for one input operand of the ALU and the destination for the output operand of the ALU. Addition is an example. In an addition situation one 16-bit word that is in memory is added to one 16-bit word that is in the accumulator, and the result is then written over the input operand that was originally stored in the accumulator. The use of two accumulators offers a degree of non-destructive operation, but provides this function only in single word length operations.

The need remains in the art for an enhanced microprocessor whose specialized hardware and instruction set address the problem of operating on long, multiple word length data in an efficient, consistent and unified manner.

Innovative Processor with Accumulator Register and Improved Filed Word-Length Processing This application discloses specialized microprocessor hardware and a specialized instruction set that provides efficient data processing operations on long word length or bit length data. In accordance with the preferred embodiment, instructions that manipulate data include a reserved bit-switch (in the form of a 2-bit field) whose status (A0) causes the instruction to be executed once to operate on a single word of data, or whose status (A0S) causes the instruction to be repeatedly executed as the instruction operates on a chain or list of sequential data, fort example a data chain that comprises the number N of 16-bit words of data wherein N is an integer.

The preferred embodiment involves both specialized hardware structures and specific instruction set enhancements that addresses the problem of operating on long multiple word width data in a efficient, consistent, and unified way. Every instruction word that manipulates data has a reserved bit switch that will cause the instruction to be executed either once operating on single word data or as a repeated execution of the same instruction operating on a chain or list of sequential data (n words).

According to the preferred embodiment, several hardware structures are necessary to support this extended precision instruction set definition. First, a hardware chain register with counter was included to control the repeat count and number of words in the chain.

Second, a register file was implemented to provide the accumulation function for the ALU. Third, specialized address control was necessary to control the sequential acquisition of up to two input operand chains and one output operand chain. Fourth, extra ALU status logic was included to handle arithmetic and logical status in a unified way independent of data width. Fifth, the product high register was routed to the partial sum input of the hardware multiplier to enable a consistent chain multiply function.

The preferred embodiment provides a one-word length ALU (31 of FIG. 1), provides the concept of word chains, and in addition the preferred embodiment provides for the ability to specify four different storage areas that each store a pair of chain values, thus overcoming disadvantages of prior microprocessors.

The disclosed embodiments look at data in a consistent way and have very few limitations relative to number of bits used to represent data. Code is essentially identical for operating on single 16 bit words and operating on up to 32 16-bit words (up to 512 bits total). Execution time is extended linearly with the number of words in the operands with very little or no software overhead. The code is compact, logical and easy to understand.

These and other features and advantages of the innovative processor hardware will be apparent to those of skill in this art upon reference to the following detailed description of preferred embodiments of the invention, which description makes reference to the drawing.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1A:
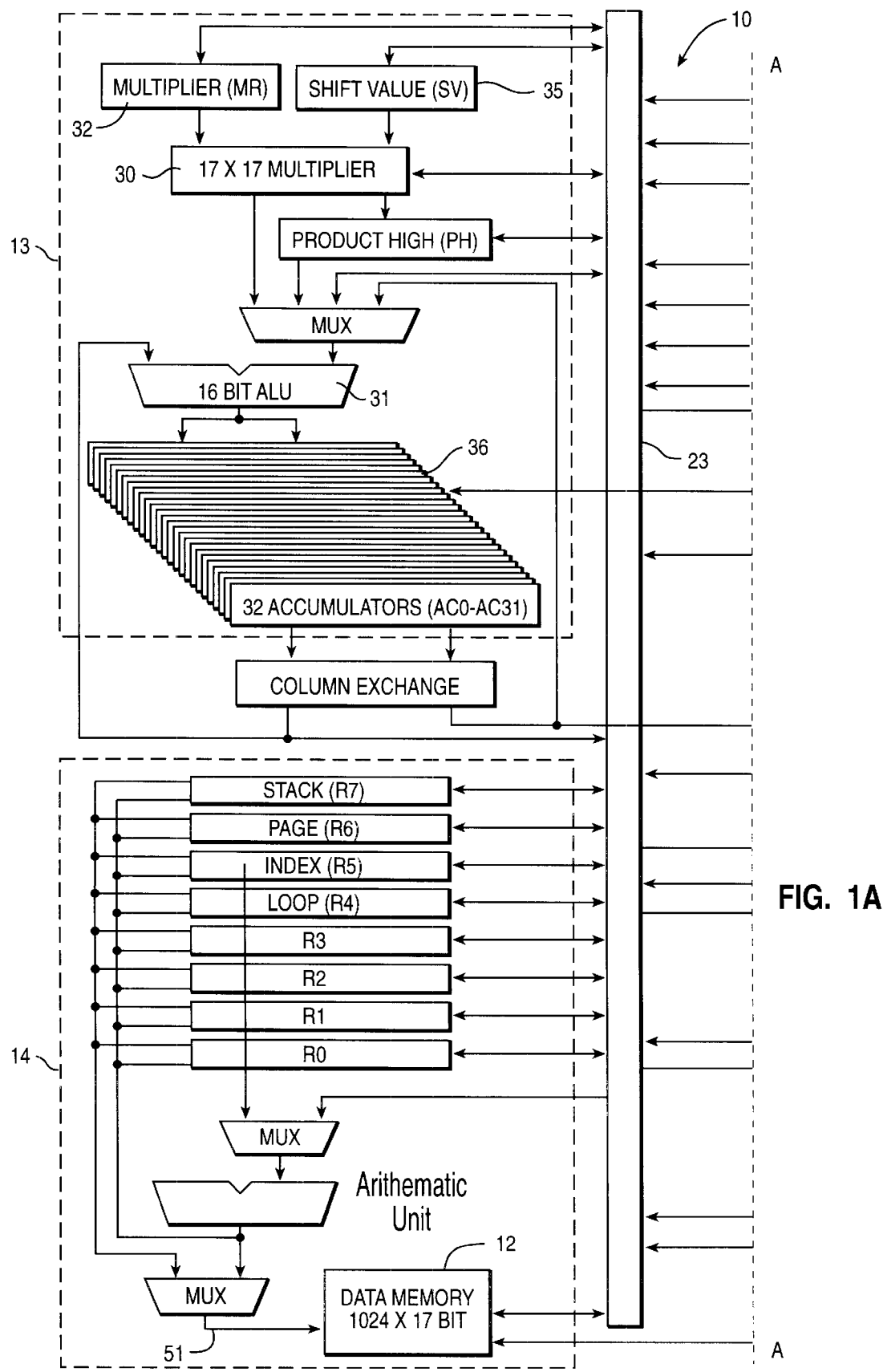
FIGS. 1A and 1B together show the construction and arrangement of a microprocessor in accordance with the preferred embodiment.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

A microprocessor, or more simply a processor, according to the preferred embodiment is of general utility, and finds particular utility in applications such as high speed calculators and medium speed digital signal processor (DSP) systems. The processor can be used with a variety of different memory configurations and with a variety of different peripheral devices to create a wide variety of application-specific consumer products.

The basic architecture of the processor of the presently preferred embodiment includes a high speed computational-unit (CU) and a full-featured data-memory-address-unit (DMAU). The processor die or chip provides separate data and program memory spaces, thus permitting parallel access and maximum computational throughput. In order to achieve minimum power consumption, static logic implementations form the processor's functional blocks, with major functional blocks being disabled when not in use. A number of different internal memory sizes and types can be combined with customized peripheral devices and interrupt logic to provide a wide variety of customized devices, each of a different utility.

In the presently preferred embodiment, but without limitation thereto, program and data memory is restricted to internal memory blocks that can not be expanded by the use of external memory. Program memory comprises ROM, EPROM, or OTP, for example the quantity 64K of 17-bit words. Data memory is RAM. In accordance with the spirit and scope of the invention, different embodiments feature different combinations of program and data memory sizes, with program memory generally comprising at least 16K of 17-bit words. When mass data storage is required, an auxiliary data memory peripheral interface can be provided.

In order to merge the requirements of numerical processing in both the calculator field and the DSP field, the processor provides a 16-bit word length. This choice also sets the processor's program address limit to generally 64K words, each of a 16-bit length.

Particular Innovative Features

Hardware features in accordance with the presently preferred embodiment include a hardware chain-register/ counter (17 of FIG. 1) in which word-length N is stored, and which controls repetition of chain-instructions in accordance with the number N of words that are in the data chain. In the operation, chain-instructions operate by default to reference this chain-register/counter in order to determine a length-value N of the word chain. This default condition can be overridden by prefacing a chain-instruction with a repeat-instruction that operates to pass a chain length value to the following chain-instruction.

Figure 1B:
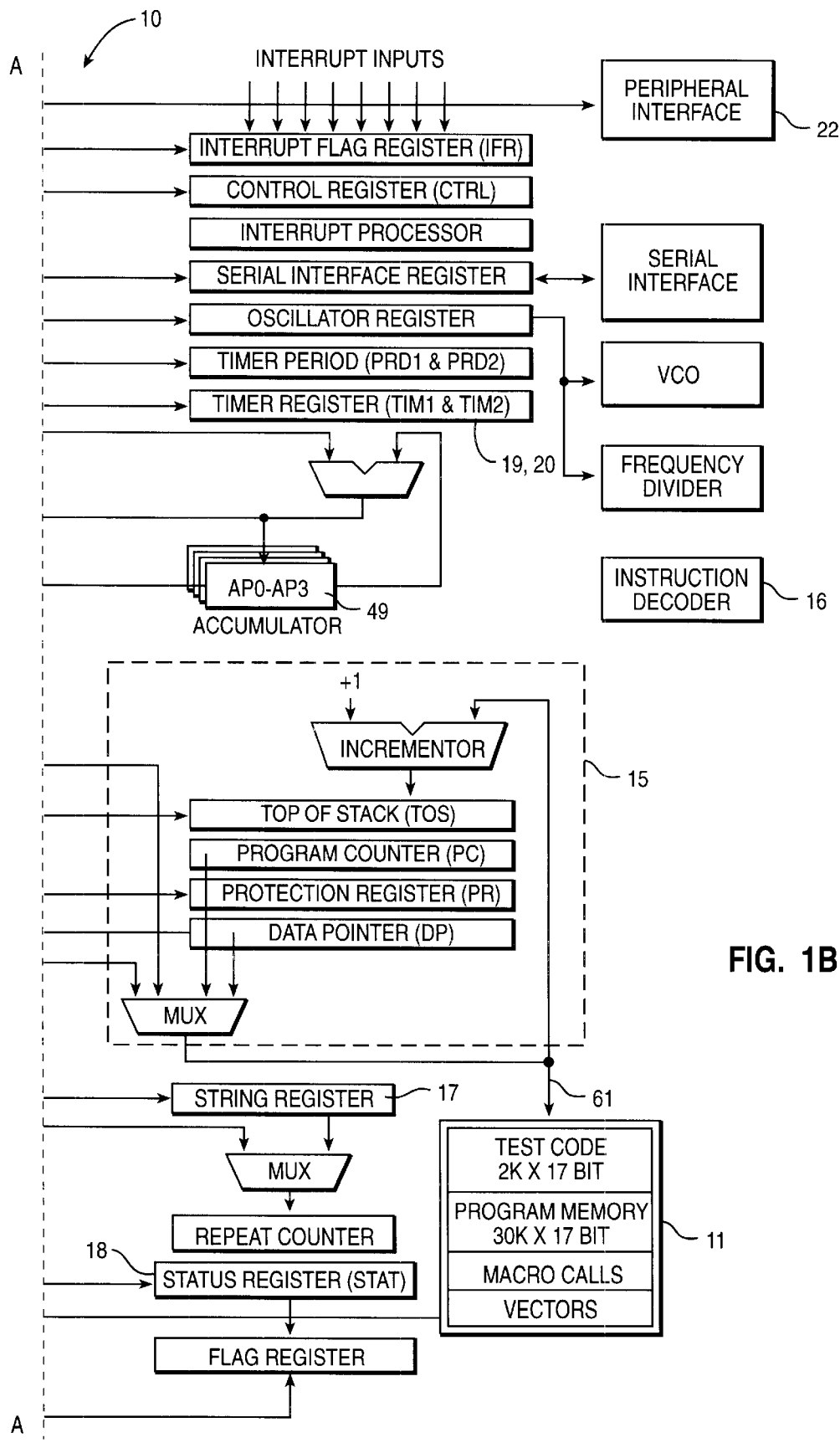

Secondly, a hardware accumulator-register-file (36 of FIG. 1) provides an accumulator function for an ALU (31 of FIG. 1). This accumulator-register-file provides temporary storage for one operand and one result, both of which may be represented by a multiple-word chain. This accumulator-register-file is made up of two hardware accumulators.(AC (0) through AC(15), and AC(16) through AC(31) of FIG. 1), each hardware accumulator having a number such as 16 of individual hardware registers for storing chains of word data. As a result, three-operands can be handled in only one clock or microprocessor cycle per word, for example N cycles for three word-chains that are each N words long.

Thirdly, the accumulator-register-file includes specialized hardware (70 of FIG. 5) to control the sequential acquisition of up to two input data operand chains and one output operand chains. The accumulator register files can point or control access to, in the preferred embodiment, up to two input operands and one output.

That is, in order to address memory-stored operands for use in ALU operation, a hardware address-control-unit is provided, and a similar hardware function is provided for the accumulator-register-file. These hardware address-control-units operate to auto-increment an address of the first or LSW word of a multi-word chain, after the LSW word is fetched from memory. For indirect address referencing, the indirect address value that is stored in an indirect-register (ACP 49 of FIG. 5) is copied, and this address-copy is sequentially incremented in order to read the complete word chain.

Note, that the initial indirect reference that is stored in the indirect-register is not changed. This results in a permanent reference being maintained to the LSW of the word chain, this permanent reference remaining until it is explicitly changed by a program that is being run by the microprocessor.

As a fourth feature, additional hardware ALU-status-logic is provided to handle arithmetic and logic status in a unified manner that is independent of bit length.

As a fifth feature, a hardware product-high-register (34 of FIG. 5) is routed to the partial-sum input (71 of FIG. 5) of a hardware multiplier (30 of FIG. 5), to thus enable a consistent chain multiply function.

As a sixth feature, a hardware single-cycle-multiplier (30 of FIG. 1) is included in the microprocessor's ALU to accept two 16-bit operands and to generate a 32-bit product.

Accumulator and Multiplier Structure

This single-cycle-multiplier is constructed and arranged to multiply one 16-bit multiplier-operand by a multiplicand-operand that may comprise one word of a multiple word chain. The resulting product has one extra word in length when it is compared to the word length of the input word chain. Since the length of the word chain is usually indicated by the hardware chain register/counter, an extra cycle is added for all such chain operations.

Since this single-cycle-multiplier can interpret operands as either signed or unsigned, all word multipliers, except the last, are forced to the unsigned mode. In addition, this single-cycle-multiplier can be used as a barrel-shifter to provide for the barrel shifting of data chains that comprise from 0bit to 15-bits.

In order to provide for correct and unified arithmetic and status extraction with respect to single data word operations, the carry-out bit is linked with the carry-in bit of the next word calculation, and the word-status bit (equal or zero) is logically ANDED. In addition to making additions and subtractions correct, long chain comparisons also reflect the correct status.

The preferred embodiments provide a more comprehensive and code-efficient microprocessor for use in high-precision calculations. The construction and arrangement of the preferred embodiment views data in a consistent manner for all multiply, shift, arithmetic, and logical operations. The construction and arrangement of this embodiment has very few limitations relative to the number of bits that are used to represent data, and the program code is essentially identical for operating on data lengths of from 16-bits to word chains comprising 512-bits. The program codes that are required to execute a single word operation or a word chain operation are generally identical, and these program codes are compact.

In particular, the hardware multiplier of the preferred embodiment, provides very efficient and simple program-control of multiplies of up to 256×256 bits, to provide a 512 bit product. Instruction execution time is extended generally linearly with the number of words that are in the data chains, with little or no software overhead cost.

The preferred embodiment provides a 32-word (16-bits per word) paired accumulator-register-file (AC(0)–AC(31) of FIG. 1), rather than using a single or a double accumulator as in prior microprocessors. In addition, unique features are provided in the address-unit (14 of FIG. 1) of the disclosed processor that operates to address this accumulator-register-file.

In accordance with the preferred embodiment, the addressing mode is indirect addressing, i.e. a method of addressing in which the address part of an instruction contains an indirect address of a memory storage location. More specifically, a 2-bit address-pointer references or points to one of four 5-bit address-registers (49 of FIG. 5), thus requiring only two reserved indirect address bits within an instruction.

In order to expand the functioning of this accumulator-register-file, key instructions such as load, store, add and subtract cause a corresponding 5-bit address-register to pre-increment or pre-decrement thus providing for the zero-overhead manipulation of the address to three temporary-registers for each of the four states of a 2-bit address-pointer.

The accumulator-register-file also provides for the natural accumulation storage of multi-word chains of data. That is, up to thirty-two 16-bit words can be kept in the accumulator-register-file. Specialized address control (70 of FIG. 5) is provided for data operation on a word chain, wherein an accumulator-address-register (49 of FIG. 5) points to the least-significant-word (LSW) of the chain. As a chain instruction is executed by the microprocessor, this address reference is copied and then post-incremented in order to prepare for the next data word in the chain. Thus, the address reference to the chain's LSW is maintained in the accumulator-address-register, and this LSW address reference will "snap tack" to the beginning of the chain for subsequent chain operations that use the same chain of data.

The accumulator-register-file also insures that non-destructive operations can be programmed without memory thrashing occurring. This is accomplished by pairing registers within the accumulator-register-file (32 registers in total, with 16-pairs of registers), to thereby provide a paired 2-word storage for every accumulator address. For example, a total of 32 registers and 16 pairs of registers are provided.

When addressing the accumulator-register-file, most instructions assign one register within the addressed register-pair to function as an output-operand-register, and assigns the other register within the addressed register-pair to function as an input-operand-register. This register assignment by the instruction provides the capability of performing non-destructive or destructive operations on both single word length data and multi-word length data chains, while at the same time providing a zero-overhead means to commute the order of operations such as subtraction.

Another advantage of the paired 32-word accumulator-register-file of this embodiment is the ability to perform high speed chain table-lookup, a function that is very useful for decoding algorithms, array manipulation, and arrayed decision trees such as case statements in the C programming language. Usually, pipeline delays found in high speed microprocessors make table-lookup instructions cumbersome due to the fact that the program pipeline must be cleared and then reestablished for each table-lookup.

With the presently preferred embodiment's specialized control of addressing the accumulator-register-file, it is possible to do a table-lookup on 16 different addresses, thus yielding a list of 16 words of data at an average of one instruction cycle per word lookup.

Extended Precision Processing

Specialized hardware was designed, in the preferred embodiment, to provide for high performance extended precision processing while using a fixed word width processor. These hardware structures are described in detail below, in this and the following sections.

Chain instructions, by default, will reference the chain register for chain length value. This default can be overridden by prefacing a REPEAT instruction that passes a direct length value to the following chain instruction. This gives practical advantage to code efficiency when operating on two different chain lengths in the same routine. For the default reference case, there is no execution overhead to support chain length.

The accumulator register file is necessary to provide temporary storage for 1 operand and 1 result, both represented by multiple word chain of data words. The accumulator block actually consist of two distinct accumulators each having multiple registers for storing stings of data. This arrangement provides true three operand manipulation for some instructions requiring only on clock cycle per word (n cycles for 3 chains, each n words long).

In order to address stored operands for ALU operation, specialized control for the memory address unit had to be added and a similar function had to be provided for the accumulator register file. The special control will auto increment the address after the first word is fetched. For indirect address reference, the indirect value stored in the indirect registers are copied, and the copy is incremented after the first acquisition in order to read the complete chain. The initial indirect reference stored in the register is not changed, resulting in a permanent reference to the least significant word of the chain (permanent until changed explicitly by the program).

In order to make arithmetic and status extraction correct and unified with respect single data word operations, it is necessary to link the carry out with carry in of the next word calculation and logically AND the word status bit (EQUAL TO ZERO). In addition to making additions/subtraction correct, long chain comparisons also reflect the correct status.

Included in the ALU is a hardware single cycle multiplier that accepts two 16 bit operands and generates a 32 bit product. Several enhancements had to be made to make the multiply instruction to work in a consistent way with operations such as addition. The multiplier is designed so that it will multiply a single word 16 bit multiplier operand by a multiplicand operand represented by multiple word chain. Several features were included to ensure that the result provided the correct numerical answer. First the resulting product will have 1 extra word in width with respect to the multiplicand operand. Since the multiplicand operand length is controlled by the chain register/counter, an extra cycle had to be added for all "chain" multiplies. This means that, in the preferred embodiment, while 16×16-bit operations do not require an extra cycle, chain-multiplies and barrel-shift operations will require an additional cycle for the final accumulation.

Since the multiplier can interpret the operands as either signed or unsigned, string multiplication require that all word multiplies except the last to be forced to an unsigned mode. In addition, the multiplier is also used as a barrel shifter, and this implementation provides a barrel shift on a long data chain from 1 to 16 bits.

The concept of chains, as described the "background and summary" above, is not new per se and other processors have mechanisms to repeat a given instruction a prescribed number of times. A repeated add with carry with data memory address post modification will effectively execute a chain operation. The preferred embodiment is more comprehensive and provides very efficient code for high precision calculations. It is consistent for all multiply, shift, arithmetic, and logical operations maintaining correct status for data widths from 16 bits to stings of 512 bits. Code for executing a single operation or a chain operation is identical and compact. In particular, the hardware multiplier operation provides a very efficient and simple program control of multiplies of up to 256×256 bits=512 bit product. This provides distinct advantages over current implementations, which do not address string multiplication since many do not have hardware multipliers. Further, many knows systems use a fixed hardware multiplier to do extended precision multiplies by using a "multiplication by parts" algorithm which is complex, the code and execution, inefficient.

Processor Architecture

With reference to FIG. 1, a processor 10 in accordance with the preferred embodiment comprises a number of major sub-blocks, including a program-data memory block 11 and a data-memory block 12. The major sub-blocks comprise the above-mentioned computation-al-unit or CU 13 and the above-mentioned data-memory-address-unit or DMAU 14, a program-counter unit (PCU) 15, and an instruction decoder 16. Other functions are provided by a repeat or chain-counter register 17, a status register 18, two timers 19 and 20, interrupt logic 21, and a peripheral expansion interface 22.

A 17-bit data bus (DB) 23 provides communication between the functional blocks within processor 10. Most of the registers within processor 10 have read and write access to DB 23. The bus drivers (not shown) are static devices in order to avoid unnecessary power consumption, and in order to provide a maximum logic propagation time. The minimum instruction period of processor 10 is about 100 ns, with a 10 MHz processor clock (not shown) being provided.

Data memory 12 of FIG. 1 is organized as a plurality of 17-bit parallel words. The number of words varies in accordance with the application to which processor 10 is applied, but the range of 256 to 2048 words is exemplary, with 1024 words being indicated in FIG. 1. Each address 51 that is provided by DMAU 14 causes 17 bits of data to be addressed. These 17 bits will be operated on in a number of different ways, depending upon the instruction being executed. For most instructions this data is interpreted in a 16-bit word format. Two byte instructions, such as LACB and SACB cause processor 10 to read or write data in an 8-bit word format, also called a byte format. This byte format mode causes the processor hardware to read or write either the upper or the lower byte of the addressed 16-bit word, and the fetched byte is right-justified on DB 23.

In a flag-data mode, an instruction operates only on the $17^{th}$ bit of the fetched word. The $17^{th}$ bit is always read and then loaded into the MTAG bit of FIG. 1's status-register 18 for all reads of data memory 12, thus providing for the tagging of either word or byte data. For byte mode, two consecutive bytes have the same tag associated therewith. Tagged data is used by FIR, FIRK, COR and CORK instructions to emulate a circular buffer. The MTAG bit of the status-register can also be tested as a condition for branch/call instructions, or it can be combined with other test conditions and other flags to generate new conditions.

Figure 2:
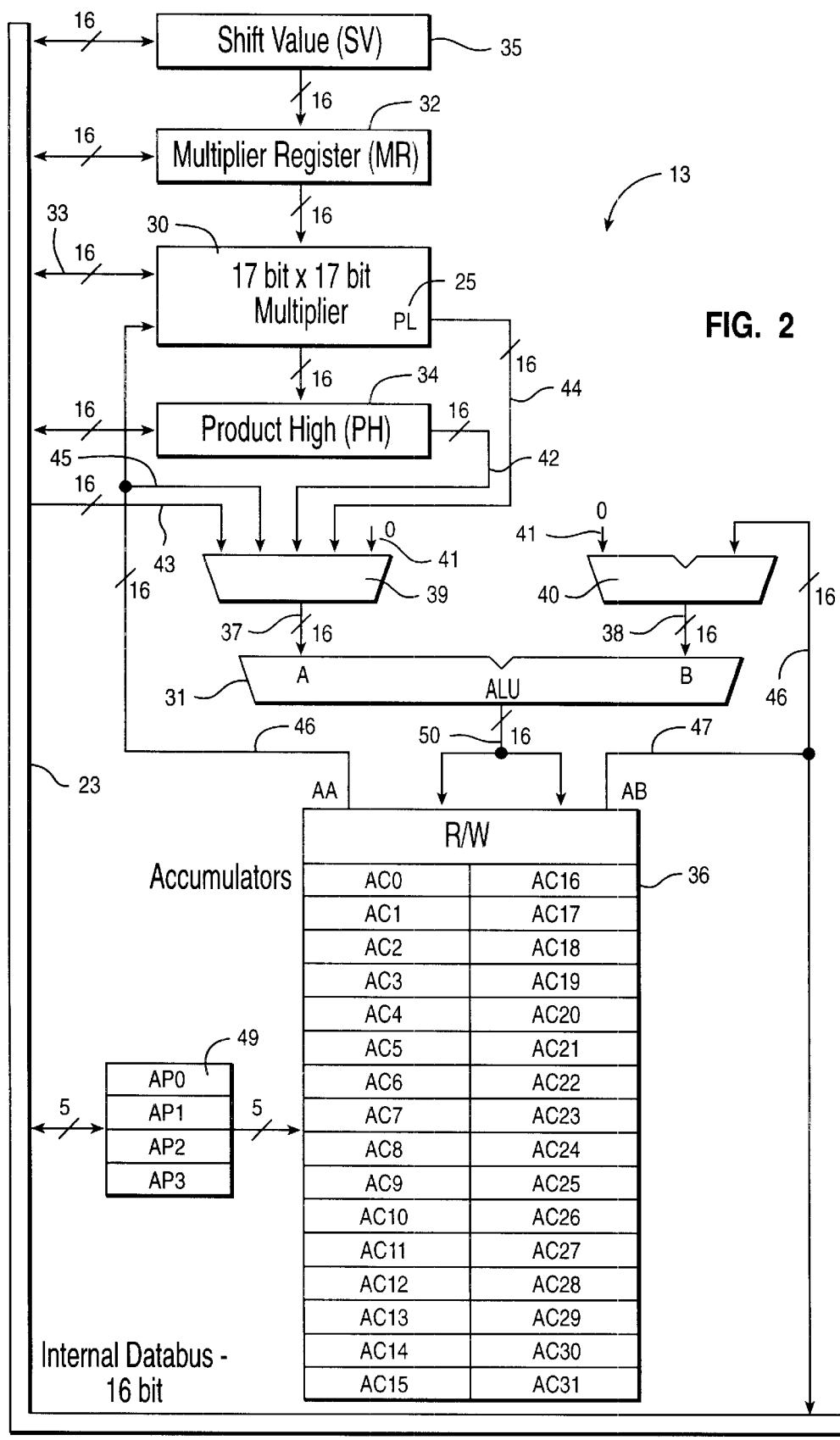
FIG. 2 shows the construction and arrangement of FIG. 1's computational unit in greater detail.

FIG. 2 shows FIG. 1's CU 13 in greater detail. CU 13 includes a 17-bit by 17-bit Booth's algorithm multiplier 30 and a 16-bit ALU 31.

Multiplier 30 is served by four system registers, i.e. a 16-bit multiplier register (MR) 32, a 16-bit write-only multiplicand input 33, a 16-bit high-word register (PH) 34 that holds the upper 16-bits of a 32-bit multiplier output, a low-word output 25 that contains the lower 16-bits of a 32-bit multiplier output, and a 4-bit shift-value register (SV) 35.

The 16-bit output 50 of ALU 31 is stored into one 16-bit location of a 32-word-location accumulator register file 36. Accumulator register file 36 operates to supply one 16-bit operand to ALU 31 (this one operand being an addressed one of the 32 words that are within accumulator register file, or being its offset), or accumulator register file 36 operates to supply two 16-bit operands to ALU 31 (these two operands being both the addressed accumulator register file word and its offset).

Multiplier 30 executes a 17-bit by 17-bit 2's complement multiply within a single instruction cycle of processor 10. One or both of the multiplier operand and the multiplicand operand can be forced to have the $17^{th}$ bit set to a positive value (i.e. a signed operand), or one or both of these operands can be forced to have a $17^{th}$ bit that is of a binary value that is equal to the binary value of its $16^{th}$ bit (i.e. an unsigned operand).

The lower 16-bits of the resulting 32-bit product are multiplexed to ALU 31 during the same instruction cycle, and this 16-bit product is loaded-to, or is arithmetically combined-with, a word register AC(0)–AC(31) that is within accumulator register file 36. The upper 16-bits of the 32-bit product are latched into PH 34 at the end of the instruction cycle.

The multiplicand operand for multiplier 30 that is obtained from FIG. 1's data memory 12 is a register word AC(0)–AC(15) from accumulator 36, or is its offset register word AC(16)–AC(31). The multiplier operand for multiplier 30 is either from 16-bit MR 32, or it is from 4-bit SV 35. MR 32 stores this multiplier operand.

For barrel-shift instructions, the multiplier operand is a 4-to-16 bit decoded value that uses 4-bit SV 35 as an input. For example, a hexadecimal value of 7H in 4-bit SV 35 results in the binary multiplier operand 0000 0000 1000 0000, thus causing a shift-left of 7 bits between the 16-bit multiplicand and the 32-bit product.

All three of the registers PH 34, MR 32, and SV 35 can be loaded from FIG. 1's data memory 12, and the content of these registers can be stored to memory 12. In addition, data can be directly exchanged between a register AC(0)–AC(31) of accumulator register file 36 and PH 34. Both long and short constants can be directly loaded to MR 32, from program memory 11. A multiplicand value is latched in write-only multiplicand register 33 from DB 23, and this multiplicand value cannot be read or transferred to memory or to system registers.

FIG. 2's ALU 31 is the focal point of CU 13 in that ALU 31 is the location within CU 13 where data is arithmetically added, subtracted, or compared. In addition, logical operations on data can occur within ALU 31. The word length of ALU 31 is 16-bits. However, most arithmetic/logical instructions can also operate on a word-chain that comprises a number of 16-bit words. Accumulator register file 36, comprising the number 32, of 16-bit storage registers AC(0)–AC(31), enhances the power of ALU 31 in terms of minimum execution time and minimum program control code.

ALU 31 has two inputs 37,38, also designed A and B in FIG. 2. Input 37,A includes a first multiplexer 39 whereas input 38,B includes a second multiplexer 40.

Multiplexer 39 selects between one of five inputs, i.e. an "all zeros" input 41, an input 42 that is provided by PH 34, an input 43 that is provided by DB 23, an input 44 that is provided by the PL output 25 of multiplier 30, or an input 45 that is provided by the offset-output 46 or AA of accumulator register file 36. Multiplexer 40 selects between "all zeros" input 41 or the AA output 46 that is provided by accumulator register file 36. The "all zeros" input 41 is necessary for transfer and unitary operations, and also serves as default values in order to minimize power consumption.

DB 23 input 43 to multiplexer 39 is used to transfer memory n values from data RAM 12 and constant values such as program memory operands to ALU 31. PH 34 input 42 and PL 25 input 44 to multiplexer 39 serve multiply-accumulate operations of ALU 31.

Accumulator register file 36 includes two outputs 46,47, also designated as AA and AB in FIG. 2. These two outputs 46,AA and 47,AB connect to ALU 31 to respectively provide an accumulator-reference and an offset-accumulator-reference to ALU 31.

Operations supported by ALU 31 include the arithmetic operations of addition, subtraction and load (add to zero), logic operations such as AND, OR, XOR, NOT, SHIFTL and SHIFTR, and compare operations that provide a comparison to constant or memory values without destroying values that are within accumulator register file 36.

Accumulator register file 36 consists of 32 registers, designated AC(0) through AC(31), with each register being a 16-bit register. Four 5-bit pointer registers 49, designated ACP(0) through ACP(3), are provided to store address pointers for accumulator register file 36. The stored content of each ACP pointer register 49 is used as an direct-reference or address to one of the 16 AC registers AC(0)–AC(15), or as an indirect-reference to an offset AC register AC(16)–AC

(31) which has a direct reference that is offset by the number 16. That is, register AC(O) has an offset register at address 16, register AC(1)'s offset is register address 17, etc. Since the register block comprising registers AC(0)–AC(31) is circular, that is since address-31 when incremented to address-32, results in address-0, the offset of registers 16–31 is registers 0–15, respectively.

Depending upon the program instruction, either or both outputs 46,AA and 47,BB of accumulator register file 36 are used. Some instructions reference only output 46,AA and cannot use or modify the offset-output 47,AB that is fetched at the same. time as output 46,AA is fetched. Other instructions provide a selection-field in the instruction word, an example being the "oa" opcode bit. These later instructions can exchange the column addressing sense, and thus the source or order of the output and the offset-output registers. Also, some instructions can control ALU output 50 to be written either to an accumulator register AC(0)–AC(15) or to its offset accumulator register AC(16)–AC(31).

Accumulator register file 36 provides a workspace that eliminates the need for many intermediate memory load and store operations. In addition, the instructions set for processor 10 includes a 2-bit field, or bit-switch, for all accumulator register file reference instructions so that a direct-reference can be made to one of the four pointer registers 49, thus eliminating memory thrashing that frequently occurs in single accumulator register designs.

An address to accumulator register file 36 is stored in one of the four ACP pointer registers 49, and a direct-reference to a pointer register ACP(0)–APC(3) is made in the 2-bit "ap" field of all accumulator referenced instructions. SAPn instructions store the contents of the ACP(n) register to memory 12, whereas LAPn instructions load from memory 12 to the ACP(n) register. An AKACP instruction and an LKACP instruction add or load, respectively, 5-bit constants to the current ACP value.

ACP registers 49 are served by a 5-bit processor (80 of FIG. 5) that provides efficient sequencing of accumulator addresses for repetitive operations that are associated with long data chains, or that are associated with relocate operations on a list of data. When operating on a multi-word data chain, an address is copied from an ACP register 49 in order to fetch the LSW in the chain. This copied-address is then repeatedly incremented to fetch the remaining words in the chain. This leaves the address stored in this particular ACP register 49 unchanged, with the value in this ACP register still pointing to the location of the LSW of the word chain. As a result, this ACP register is ready for a subsequent operation on this word chain.

Processor 10 can pre-modify a value in an ACP register 49 by the value +1 or by the value −1 before the ACP register is used by accumulator register file 36 in an accumulator-referenced instruction. This utility minimizes software overhead in manipulating an address of accumulator register file 36, for example by avoiding a software pipe lining effect that post-modification causes.

Figure 3:
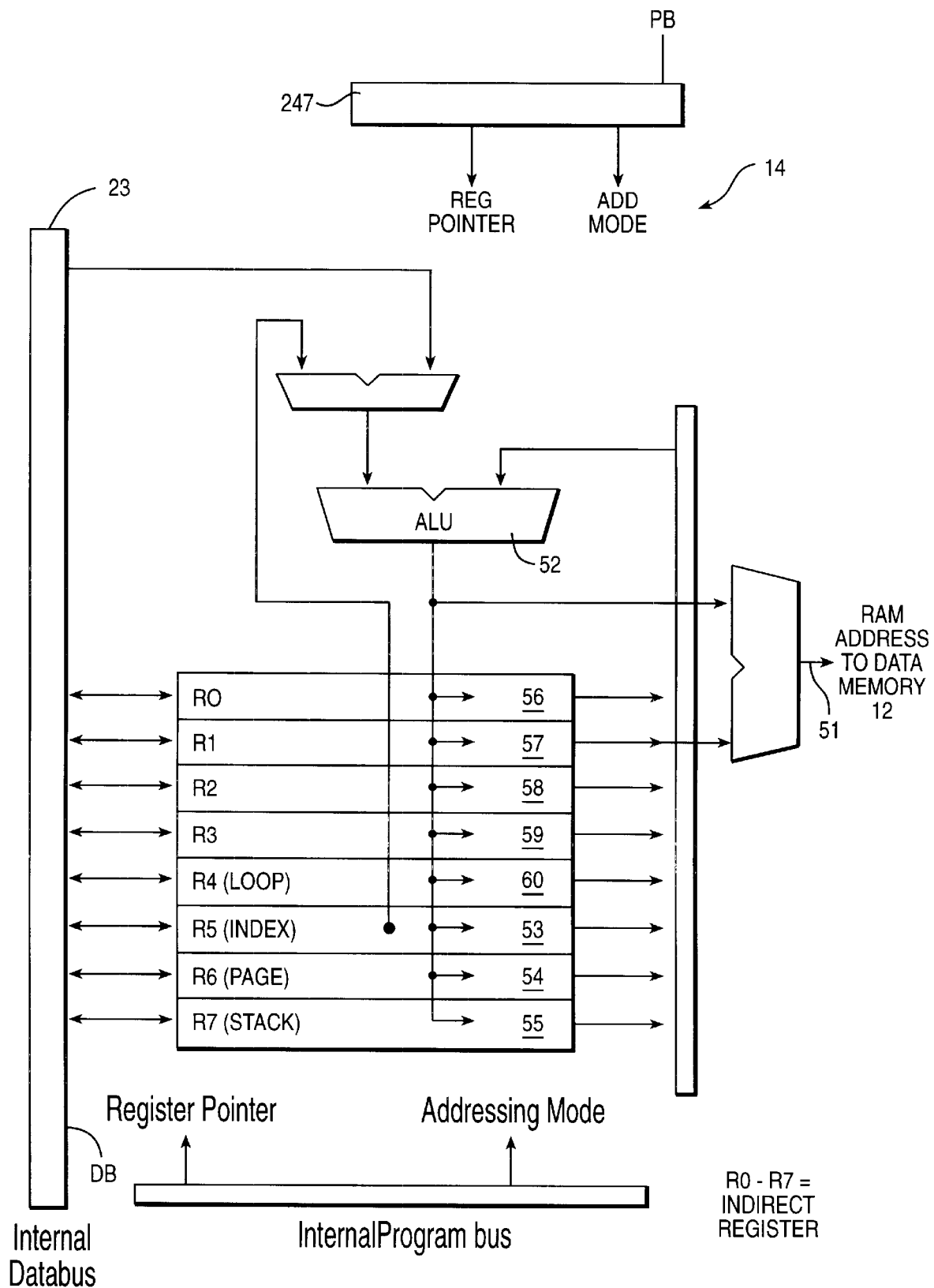
FIG. 3 shows the construction and arrangement of FIG. 1's data memory address unit in greater detail.

FIG. 3 shows DMAU 14 that operates to provide an address 51 to data memory 12. DMAU 14 includes a dedicated ALU 52 that performs add, subtract, and compare functions, three special-purpose address registers 53 (R5 INDEX), 54 (R6 PAGE), and 55 (R7 STACK), and five general-purpose registers 56–60(R0–R4). DMAU 14 generates address 51 in parallel with CU 13, thus providing high processor throughput.

DMAU 14 is capable of addressing data memory 12 by way of five addressing modes, i.e. a direct addressing mode, an indirect addressing mode, with post modification being possible, and three relative addressing modes. The three relative modes are (1) immediate-short relative to R6-PAGE (R6-PAGE+7-bit (128 bytes or 64 words)), (2) R5-INDEX relative to register base (Indirect register+R5-INDEX), and (3) long-intermediate relative to register base (Indirect register+16-bit offset).

When word-chain instructions are executed, for all addressing modes with the exception of indirect with post modification, a temporary copy of address 51 is used to fetch the LSW of the word-chain. Over the next sequence of instruction cycles this temporary address copy is auto-incremented in order to fetch the remaining words in the word-chain. Since this sequential increase in address 51 is temporary, all registers 55–60 remain unchanged, and still make reference to the LSW in memory 12.

Chain fetches using the indirect with post modification addressing mode operate to write the modified address 51 back to an indirect register for each processor cycle that involves the word chain. This causes the address in the indirect register to point to the data word whose address is one beyond the MSW in the word chain.

Figure 4:
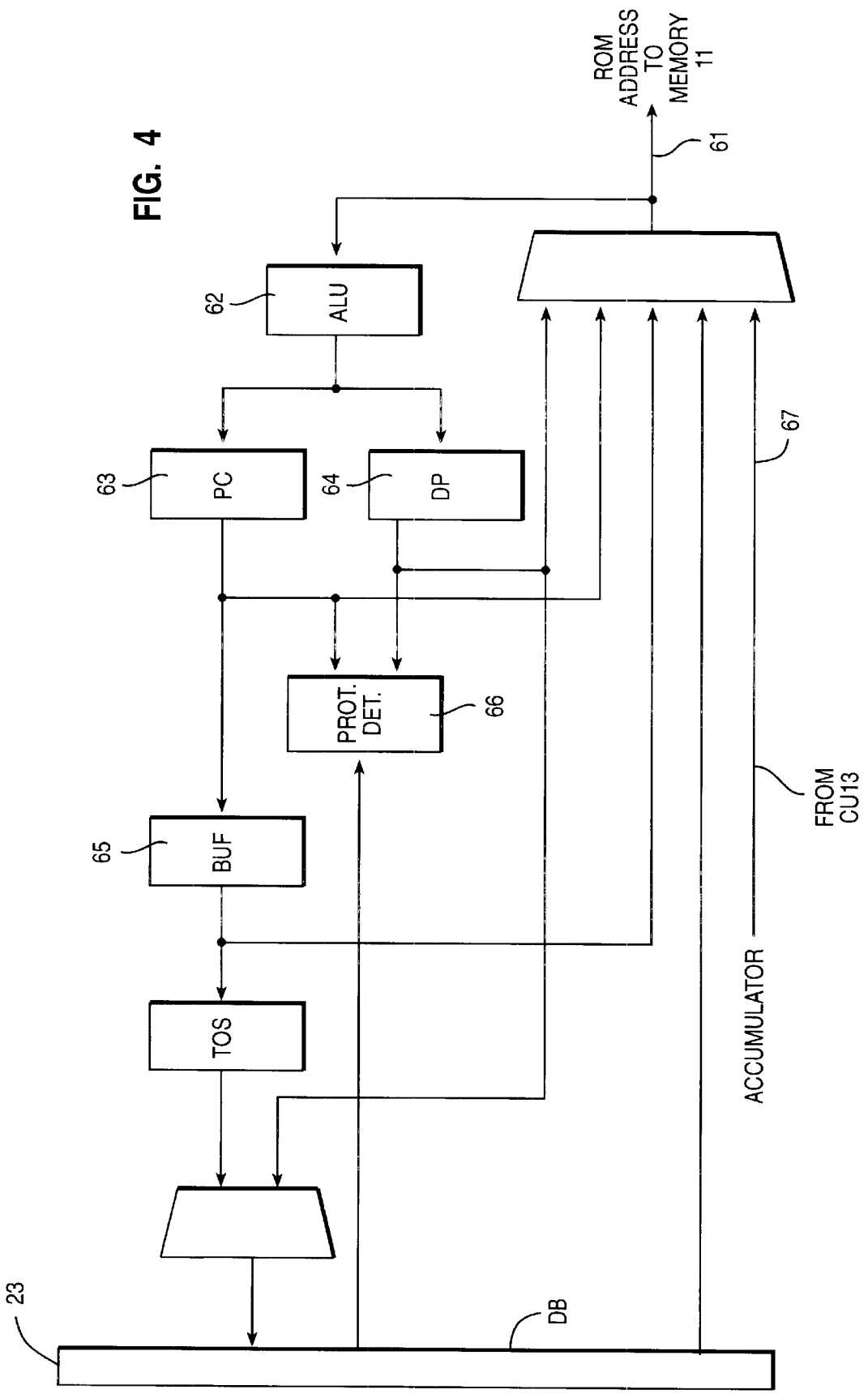
FIG. 4 shows the construction and arrangement of FIG. 1's program counter unit in greater detail.

FIG. 4 shows PCU 15 that operates to generate address 61 to FIG. 1's program memory 11. A 16-bit ALU 62 is provided for incrementing and loading ROM 11 addresses 61. Two address registers 63,PC and 64,DP operate to store ROM program address 61 in PC 63 and to store a data-pointer address in DP 64.

The content of PC 63 is saved into the PC-stack on calls and interrupts. A PC-stack comprises one hardware register (not shown) that is at the top of the stack, followed by a software stack that is provided by data memory 12, using FIG. 3's register R7-STACK in the indirect mode as the stack pointer. As a result, a deep stack that is defined by software is provided with-little execution overhead.

The content of DP 64 is loaded from accumulator register file 36 during lookup table instructions, such as LUAA and LUAM, and from PB 24 via DB 23 during the fetch of long chain constants. The content of DP 64 can be stored to data memory 12. Program detection logic 66 is included in PCU 15 to detect program address ranges that should be protected from external access.

Figure 5A:
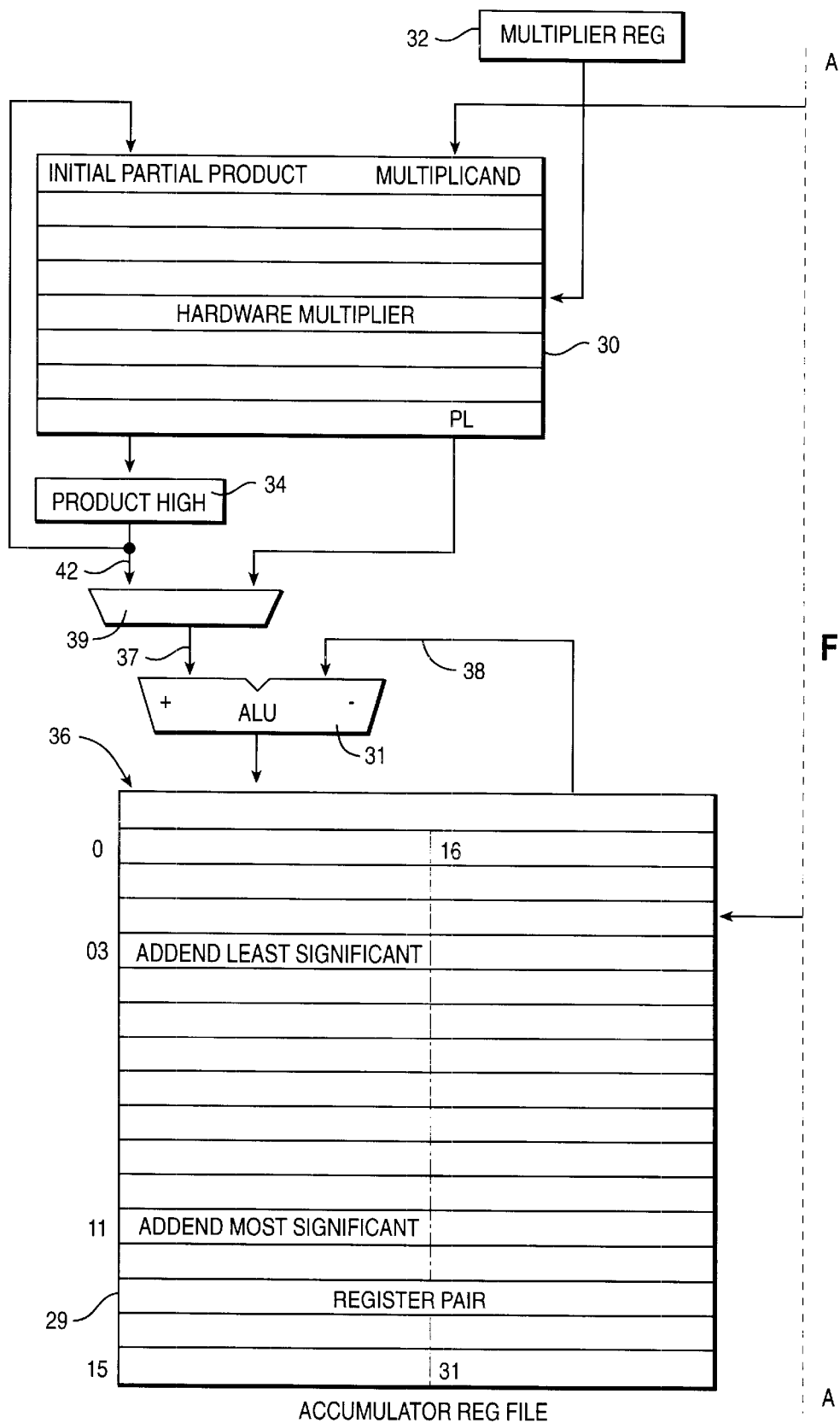
FIGS. 5A and 5B together are a view generally similar to FIG. 2, but showing data chain manipulation.
Figure 5B:
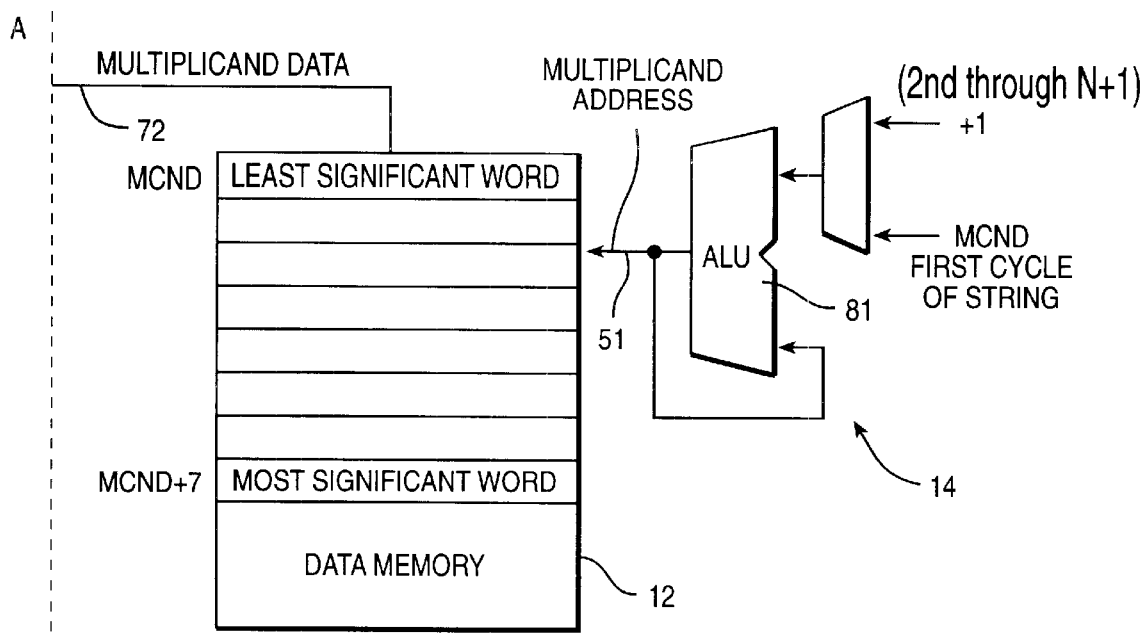
Figure 5B:
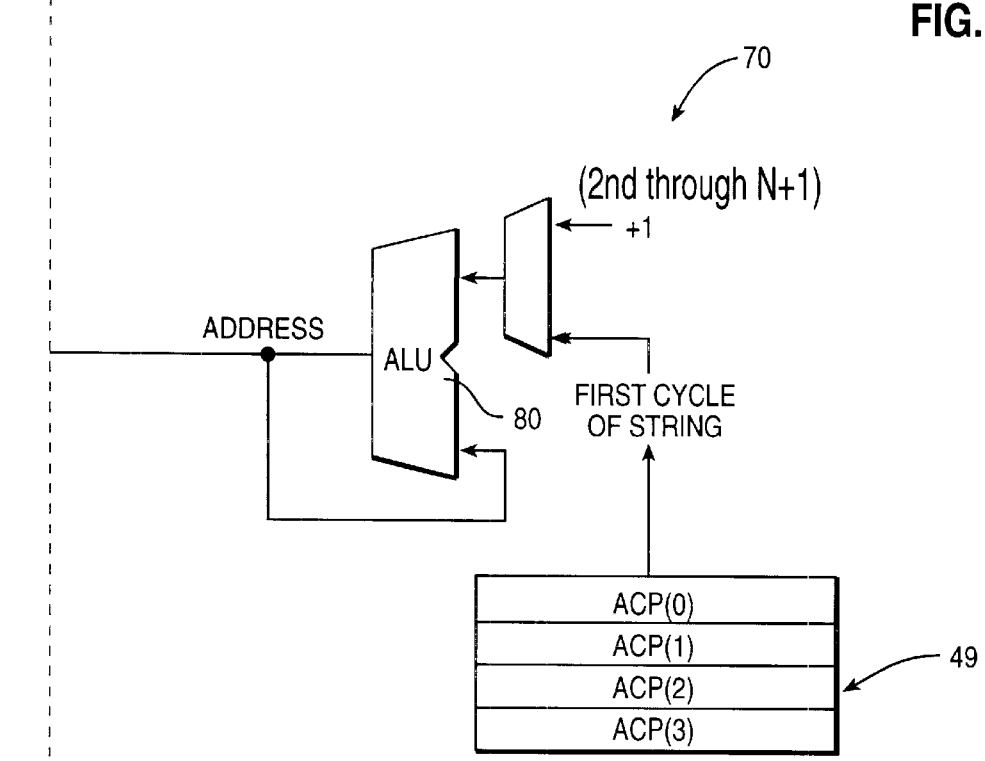

FIG. 5 is generally similar to FIG. 2, but shows a data chain manipulation. A valuable utility of the microprocessor construction and arrangement above described relative to FIGS. 1–4 is the manipulation of data chains, i.e. the manipulation of data as a list of, or as a sequence of, a number of 16-bit words. Chain manipulation of data includes all arithmetic instructions, logical instructions, and transfer instructions. Chain instructions operate on a chain beginning with the chain's LSW and ending with the chain's MSW. For example, see accumulator register file 36 of FIG. 5 wherein a chain having 9-words has its LSW stored at register AC(3) and has its MSW stored at register AC(11).

As many as three operands are involved in data chain operations, for example two input operands and one output operand. The FIGS. 1–4 processor 10 is capable of addressing three distinct storage locations for each of these three operands.

For example, a multiplicand operand 72 can be addressed in data storage 12, using DMAU 14 and its ALU 81 to provide an address or pointer control 51. The second input or addend operand and the output operand from ALU 31 can be addressed by FIG. 5's accumulator pointer unit 70 and its ALU 80 that uses indirect addressing and includes pointer ACP registers 49. The second input operand and the output operand can be addressed by ACP 70 as a pair, i.e. as an accumulator register AC(0)–AC(15) and as its paired offset-accumulator AC(16)–AC(31), for example see register pair AC(13) and AC(29) of FIG. 5.

Chain register counters 17 of FIG. 1 are used to store and control the length of a chain as an integer number of 16-bit words.

For chain instructions or operations, DMAU 14 of FIG. 1 and ACP 70 of FIG. 5 automatically increment the chain addresses to data-memory 12 and to accumulator register file 36, respectively, beginning with the LSW, to thereby sequentially read all words or values that comprise the two word-chains contained in memory 12 and accumulator 36. Chain instructions that manipulate a chain having N words require an extra cycle-count to be added to the program sequence in order to accumulate or transfer the N+1 word that comprises the product output of hardware multiplier 30.

ALU 31 and multiplier 30, shown in FIGS. 1, 2 and 5, provide control to accommodate the manipulation of 16-bit word-chains. ALU 31 automatically propagates a carry out of its $16^{th}$ stage, and then uses it as a carry-in to ALU 31 on the next processor cycle for the next significant chain-word operation. Also, an EQUAL-TO status condition is latched and propagated to the next significant word operation, to be ANDED with the next word status. Final status of sign overflow is not latched until the last, or the MSW, is operated upon.

Hardware multiplier 30 provides a connection 71 for initial partial product. At the beginning of each multiplication operation, input 71 is set to zero. However for the second through the Nth cycle, the upper 16-bits of the last word multiply is routed to connection 71. This enables N-by-1 word multiplies to generate an N+1 word product in N+1 instruction cycles, with no software overhead.

Chain Processing and Processor Operation

An example of the operation of the preferred embodiment will now be given by an (A)(B)+(C) mathematical operation while making reference to FIG. 5. In this operation, the (B)-term comprises an 8-word chain (128-bits) multiplicand that is multiplied by an (A)-term 1-word (16-bit) multiplier, wherein the resulting product (A)(B) is added to a (C)-term addend that comprises a 9-word chain (144-bits).

In accordance with the preferred embodiment, the three data terms (A), (B) and (C) are stored in FIG. 5 as follows; the 8-word (B)-term multiplicand is stored in data memory 12 with its LSW at memory address MCND and with its MSW at memory address MCND+7; (2) the 9-word (C)-term addend is stored in accumulator register file 36 at register AC(03) through register AC(11), with the address 03 of its LSW being indirectly pointed to by the content of ACP(2); and (3) the 1-word (A)-term multiplier is stored in multiplier register 32. In addition, a chain length of 8 is set into chain register 17 of FIG. 1 for the 8-word (B)-term multiplicand.

The instruction mnemonic for this mathematical operation is MPAL.A2S.MCND, comprising 2 words to code, 1-word of opcode, plus a 1-word MCND reference.

The MCND portion of this instruction specifies that memory 12 is to be multiplied by a multiplier register 32, and that the product thereof is to be added to a value that is pointed to by register ACP(2). The A2S portion of the instruction indicates the chain mode of operation, and specifies that the accumulator register file 36 register that is pointed to by the address that is stored in pointer register ACP(2) is to be used to store the 9-word (C)-term addend and to store the final result of the (A)(B)+(C) operation. The portion MCND of the instruction specifies a direct memory 12 reference to the LSW of the 8-word (B)-term chain.

Execution of the above mnemonic takes place in 9 instruction cycles, wherein an extra cycle is enabled for multiply or barrel-shift operations that create an N+1 word output chain from an N word input chain. For additions, transfers, and logical operations, only 8 instruction cycles are required to operate on an 8-word chain.

If the (A)-term multiplier is designated as MPR, if the (B)-term multiplicand is designated as M7–M0 with its MSW M7 being p<S stored within data memory 12 at address MCND+7, and if the (C)-term addend is designated as A8–A0 with its MSW A8 being stored within accumulator register file 36 at address 11, then the execution of these 9 instruction cycles can be represented as;

MPR×M7::M6::M5::M4::M3::M2::M1::M0=P8:: P7:: - - - P1::P0,

A8–A0=(P8–P0)+(A8+A0)

Aspects of the FIG. 5 construction and arrangement that support chain operations of the above type include the fact that (1) the accumulator that comprises registers AC(0–15) of accumulator register file 36 is of a dual-port read/write design having a delayed pointer reference to; account for the instruction cycle delay through ALU 80, (2) accumulator registers AC(0–15) and their corresponding offset-accumulator registers AC(16–31) enable the addressing of two operands with a single pointer register ACP(0)–ACP(3), wherein an accumulator register and its offset register can be used as input, as output, or as both input and output for ALU operands, and (3) the automatic incrementing of pointer registers ACP(0)–ACP(3) to consecutively read the words of a chain is a temporary process that leaves the ACP registers unchanged for correct future reference to the LSW of the chain during future chain operations.

The present embodiment's ability to extend a chain with an extended sign word allows very efficient N-word-chains-by-M word-chain multiplies to be implemented in software. The programming necessary to take advantage of this innovative hardware and architecture is well within the ability of one of ordinary skill in the art, in light of the above disclosure.

MSP58P70 Architecture

The presently preferred embodiment corresponds to the MSP58P70 by Texas Instruments, Inc. The MSP58P70 has a powerful instruction set. The instructions can individually address bit, byte, word or a string of words or bytes. The program memory is 17-bit wide and the entire 17-bit width is used for instruction set encoding. Programs are executed from internal program memory. Execution from external memory is not possible. Both the program and data memory of the MSP58P70 is restricted to internal blocks and can hot be expanded externally. In the presently preferred embodiment, the program memory is One Time Programmable (OTP) ROM and limited to 32K 17-bit words, 2K of which is reserved for internal test code and is not accessible by user programs. Also in the presently preferred embodiment, the data memory is static RAM and is limited to 1024 17-bit words, 16 bits of which are an arithmetic value while the 17th bit is used as a flag or tag.

The MSP58P70 Instruction Set

The following instruction set description is included to illustrate how instructions are coded in the MSP58P70, in the presently preferred embodiment. The structure of these exemplary instructions take advantage of the claimed features of the preferred embodiments, but of course it is well within the ability of one of ordinary skill in the art to design other instructions sets which exploit the claimed features.

The machine level instruction set of the preferred processor is divided into a number of classes. The classes are primarily divided according to field references associated with memory, hardware registers, and control fields. The following descriptions give class encode bit assignments, OP code value within class, and abbreviated field descriptions. The following table defines these field abbreviations:

| Field codes | Description |
|---|---|
| rx | rx used for memory address. |
| R | rx addressed as general register. |
| K | Constant field |
| s | Chain field |
| V | MacroCall paged vector address. |
| S | Status source |
| C | Condition field for program jumps |
| pa | Port address field. |
| fa | Flag address field. |
| N | Logical inversion field. |
| g/r | Global or relative to Page flag reference |
| ac | Accumulator address control |
| oa | offset accumulator select |
| ap | Accumulator pointer |
| acx | Destination accumulator pointer Op Code Fields |

Memory/Accumulator Reference Instructions (Class I.)

This class of instructions control execution between data memory and the accumulator block. In addition to the explicit op code field that specifies an arithmetic operation, an eight bit memory reference field controls the addressing of one input operand, a 4 bit field (class 1a) or 2 bit field(class 1b) selects an accumulator location as the other input operand. The results are written to the addressed accumulator location (or to the offset accumulator if class 1a and acx bit=1). In addition, each instruction can be treated as a single word length operation or as a chain, depending on the chain control encoded in the op code (s bit set in class 1b and acc field=10 in class 1a).

Class 1a provides the basic four instructions of load, store, add, and subtract between accumulator and memory blocks. Either accumulator or offset accumulator (acx bit dependent) can be stored to memory. with the SAC instruction. The LAC instruction can load either accumulator or offset accumulator depending on the acx bit. The ADD or SUB instructions will add or subtract memory from the addressed accumulator register and save the results either back to the addressed accumulator register (acx=0) or to its offset (acx= 1). Two of the four codes provided by the acc field will cause a pre-increment or pre-decrement of the accumulator register pointer (ACP) prior to execution. This pre-increment is a permanent change to the referenced ACP and further expands the use of the accumulator block as an efficient workspace. The pre-increment and pre-decrement cannot be used in combination with chain mode.

One of the four codes of the acc field (acc=11) will cause the instruction to be treated as a multi-cycle chain instruction. This will not result in any permanent modification to the referenced ACP. See discussion on chain operation in section 2.2.1.

Since there is no reference to offset accumulator in Class 1b instructions, the execution operands will be only memory and the accumulator register.

All other modes of control (chain, pre-increment/ predecrement ACP, memory adddressing modes, etc.) are provided for logical, byte, multiply/accumulate, and barrel shift type instructions.

Class 1a Instruction Descriptions -- Accumulator/Memory

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 0 | | | acx | ac | ac | ap | ap | am | am | am | rx | rx | rx | pm | pm |

| INST | OP | DESCRIPTION |
|---|---|---|
| ADD | 0 | Add memory location to accumulator and store results into accumulator (acx = 0) or offset accumulator (acx = 1). ALU status modified. |
| SUB | 1 | Subtract memory location from accumulator and store results into accumulator (acx = 0) or offset accumulator (acx = 1). ALU status modified. |
| LAC | 2 | Load accumulator (acx = 0) or offset accumulator (acx = 1) with memory location. ALU status modified. |
| SAC | 3 | Store accumulator (oa = 0) or offset accumulator (oa = 1) to memory. Transfer status modified. |

Class 1b Instruction - Accumulator/Memory

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 1 | | | | | s | ap | ap | am | am | am | rx | rx | rx | pm | pm |

| INST | OP | DESCRIPTION |
|---|---|---|
| OR | 0 | Logical OR of memory and accumulator. Results stored back into accumulator. ALU status modified |
| AND | 1 | Logical AND of memory and accumulator and store the results to accumulator. ALU status modified |
| XOR | 2 | Exclusive OR of memory and accumulator and store the results to accumulator. ALU status modified |
| LACB | 3 | Load addressed byte in memory to lower 8 bits of accumulator. Zero fill upper byte in accumulator ALU status modified. |
| SACB | 4 | Store lower 8 bits of accumulator to memory. Data byte is automatically routed to either the lower byte or upper byte in the 16 bit memory word based on the lsb of the address. Transfer status modified. |
| RESERVED | 5 | N/a |
| CMPR | 6 | Store the arithmetic status of memory location subtracted from accumulator into ALU status bits. No modification of accumulator. |
| LUAM | 7 | Look up value stored in ROM addressed by accumulator and store into RAM memory location. Transfer status modified. |
| MPtL | 8 | Multiply MR register by memory and transfer the lower 16 bits of the product to the accumulator. Latch the upper 16 bits into the PH register. ALU status modified |
| LMRsH | 9 | Load MR register in the signed mode from memory. In parallel, also subtract PH register from accumulator. Chain bit will "chain" with the previous ALU status (ACOUT, AEQO) but not load chain counter (executes once). ALU status modified. |
| LMRaH | 10 | Load MR register in the signed mode from memory. In parallel, also add PH register to accumulator. Chain bit will "chain" with the previous ALU status (ACOUT, AEQO) but not load chain counter (executes once). ALU status modified. |
| MPaL | 11 | Multiply MR register by memory and add the lower 16 bits of the product to the accumulator. Latch the upper 16 bits into the PH register. ALU status modified. |

-continued

| INST | OP | DESCRIPTION |
|---|---|---|
| BStL | 12 | Shift 16 bit mem value left n bits (SV reg) into a 32 bit result with zero fill on right and either zero fill or sign extention on left (XSGM mode). Transfer lower 16 bits to accumulator and latch upper 16 bits in PH. ALU status modified. |
| BSsL | 13 | Shift 16 bit mem value left n bits (SV reg) into a 32 bit result with zero fill on right and either zero fill or sign extention on left (XSGM mode). Subtract lower 16 bits from accumulator and latch upper 16 bits in PH. ALU status modified. |
| BSaL | 14 | Shift 16 bit mem value left n bits (SV register) into a 32 bit result with zero fill on right and either zero fill or sign extention on left (XSGM mode). Add the lower 16 bits to accumulator and latch upper 16 bits in PH. ALU status modified. |
| MPsL | 15 | Multiply MR register by memory and subtract the lower 16 bits of the product from the accumulator. Latch the upper 16 bits into the PH register. ALU status modified. |

Accumulator/Constant Reference (Class 2)

These instructions provide the capability to reference short (8 bits) or long (16 bits or n×16 bit chain) constants stored in program memory and to execute arithmetic and logical operations between accumulator contents and these constants. Since RONCO is a Harvard type processor, these instructions are necessary and distinct from the general class of memory reference instructions. Subclass 2a listed below include references between accumulator and short 8 bit constants. This class has the advantage of requiring only 1 instruction word to code and 1 instruction cycle to execute and is particularly useful for control variables such as loop counts, indexes, etc. The short constants are also provide full capability for byte operations in a single instruction word.

Subclass 2b references accumulator and long constants from ROM (16 bits for non chain constants and n*16 bits for chain constants). Class 2b instruction take 2 instructions words to code. Execution of these instruction is 2 instruction cycles when the long constant is a single word and 2+n execution cycles for n word chain constants. One major difference between long constants (16 bits) and long chain constants (n*16 bits) is the reference made to the constants in the second word of the two word instruction word. Reference made to single 16 bit integer constants is immediate, that is, the actual constant value follows the first word op code in the memory. For chain constants, the second word reference to the constants is immediate indirect which indicates that the second word is the address of the least significant word of the chain constant. This definition allows all long chain constants to be located in a table and permits the reference in the machine language listing to be consistent with those of shorter constants.

Class 2a instruction definitions --- Short Constants

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | 0 | 1 | 0 |  |  |  | ap | ap | K | K | K | K | K | K | K | K |

| INST | OP | DESCRIPTION |
|---|---|---|
| ADSK | 0 | Add 8 bit positive constant to accumulator and store result to accumulator. ALU status modified. |
| LACSK | 1 | Load 8 bit positive constant into accumulator. ALU status modified. |
| SBSK | 2 | Subtract 8 bit positive constant from accumulator and store result accumulator. ALU status modified. |
| CMSK | 3 | Modify ALU status with the result of 8 bit positive value subtracted from accumulator. Original accumulator value not modified. |
| ORSK | 4 | Logical OR 8 bit positive constant with accumulator and store result to accumulator. ALU status modified. |
| ANDSK | 5 | Logical AND 8 bit positive constant with accumulator. Store result to accumulator. ALU status modified. |
| XORSK | 6 | Logical XOR 8 bit positive constant with accumulator. Store result to accumulator. ALU status modified. |
| LMRSK | 7 | Load 8 bit constant to Multiplier register (MR). Changes multiplier mode to signed mode in status register. |

Class 2b instruction definitions -- Long Constants

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | 1 | 1 | 0 | 0 | ac | ac | ap | ap |  |  | 0 | 0 | 1 | oa | ac x |  |

| INST | OP | DESCRIPTION |
|---|---|---|
| ADLK | 0 | Add long constant to accumulator (or offset accumulator if oa = 1) and store result to accumulator (acx = 0) or offset accumulator (acx = 1). ALU status modified. |
| LACLK | 1 | Load long constant to accumulator (acx = 0) or to offset accumulator (acx = 1). ALU status modified. |
| SBLK | 2 | Subtract long constant from accumulator (oa = 0) or from offset accumulator (oa = 1) and store result to accumulator (acx = 0) or offset accumulator (acx = 1). ALU status modified. |
| CMLK | 3 | Modify ALU status by subtracting a long constant from accumulator (oa = 0) or from offset accumulator (oa = 1). Neither the accumulator or offset accumulator will be modified |
| ORLK | 4 | Logical OR long constant with accumulator (oa = 0) or with offset accumulator (oa = 1) and store result to accumulator (acx = 0) or offset accumulator (acx = 1). ALU status modified. |
| ANDLK | 5 | Logical AND long constant with accumulator (oa = 0) or with offset accumulator (oa = 1) and store result to accumulator (acx = 0) or offset accumulator (acx = 1). ALU status modified. |
| XORLK | 6 | Logical exclusive OR long constant with accumulator (oa = 0) or with offset accumulator (oa = 1) and store result to accumulator (acx = 0) or offset accumulator (acx = 1). ALU status modified. |
| LMRLK | 7 | Load long constant to Multiplier register (MR) in signed mode. No change in status |

Accumulator Reference (Class 3.)

These instructions reference the accumulator and, in some instances, specific registers for transfers. Some instructions use a single accumulator operand and others use both the accumulator and the offset accumulator to perform operations between two accumulator values. The "oa" bit in the instruction word reverses the sense of the addressed accumulator and the addressed offset accumulator. In general, if oa=1, the instruction uses the offset accumulator as the input operand on single accumulator operand instructions, and interchanges the arithmetic order (subtract, compare, multiply/accumulate, etc.) of the two operand when both are used. Exceptions to the rule are instructions NEG, NOT, MPACsL, MPACaL, BSACtL, MPACtL, BSACsL, and BSACaL, which uses the reverse oa control (oa=1->accumulator, oa=0->offset accumulator). The acx bit in the instruction word controls the destination of the result to be the accumulator (acx=0) or the offset accumulator (acx=1).

In addition to basic accumulator arithmetic functions, this class also includes an accumulator lookup instruction and several register transfer instructions between accumulator and MR, SV, or PH register.

As with all accumulator referenced instructions, chain operation are possible as well as pre modification of 1 of 4 indirectly referenced accumulator pointer registers (ACP).

Class 3 instruction definitions -- Accumulator Reference

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1  | 1  | 1  | 0  | 0  | ac | ac | ap| ap|   |   |   |   |   | 0 | oa|acx|

| INST | OP | DESCRIPTION |
|------|----|----|
| NEG | 0 | Store the 2's Compliment of accumulator (oa = 1) or offset accumulator (oa = 0) to the accumulator (acx = 0) or to the offset accumulator (acx = 1). ALU status modified. |
| NOT | 1 | Place the 1's compliment of accumulator (oa = 1) or offset accumulator (oa = 0) back into the accumulator (acx = 0) or into the offset accumulator (acx = 1). ALU status modified. |
| LUAA* | 2 | Look Up value in ROM addressed by accumulator (oa = 0) or offset accumulator (oa = 1) and place the lookup value into the accumulator (acx = 0) or offset accumulator (acx = 1). Lookup address is post incremented in DP reg. ALU status modified with lookup val. |
| ZAC | 3 | Zero accumulator (acx = 0) or offset accumulator (acx = 1). ALU status modified. |
| SBAC | 4 | Subtract offset accumulator from accumulator (oa = 0) or subtract accumulator from offset accumulator (oa = 1) and store in accumulator (acx = 0) or offset accumulator (acx = 1). ALU status modified. |
| ADAC | 5 | Add accumulator to offset accumulator and store result to accumulator (acx = 0) or offset accumulator (acx = 1 ). ALU status modified. |
| SHL | 6 | Shift accumulator left 1 bit and store the result into accumulator (acx = 0) or offset accumulator (acx = 1). Lsb set to zero and msb stored in carryout status bit. ALU status modified. |
| CAC | 7 | Copy accumulator (oa = 0) or offset accumulator (oa = 1) to accumulator (acx = 0) or to offset accumulator (acx = 1). ALU status modified. |
| XORAC | 8 | Logically exclusive OR accumulator with offset accumulator and store results into accumulator (acx = 0) or offset accumulator (acx = 1). ALU status modified. |
| ORAC | 9 | Logically OR accumulator with offset accumulator and store results into accumulator (acx = 0) or offset accumulator (acx = 1). ALU status modified. |
| ANDAC | 10 | Logically AND accumulator with offset accumulator and store results into accumulator (acx = 0) or offset accumulator (acx = 1). ALU status modified. |
| SHR | 11 | Shift accumulator (oa = 0) or offset accumulator (oa = 1) right 1 bit and store result in accumulator (acx = 0) or offset accumulator (acx = 1). MSB will be set to zero or be set equal to the sign bit (XSGM dependent). ALU status modified. |
| SPHAC** | 12 | Subtract product high register from accumulator (oa = 0) or from offset accumulator (oa = 1) and store the result into accumulator (acx = 0) or into the offset accumulator (acx = 1). ALU status modified. Chain bit causes "sub with carry status (ACOUT). |
| TPHAC** | 13 | Add product high register to accumulator (oa = 0) or to offset accumulator (oa = 1) and store the result into accumulator (acx = 0) or into the offset accumulator (acx = 1). ALU status modified. Chain bit causes "add with carry status (ACOUT). |
| TPHAC** | 14 | Transfer product high register to accumulator (acx = 0) or offset accumulator (acx = 1). ALU status modified. Chain bit will cause chaining with current AEQ0 status bit. |
| XSGN** | 15 | Copy ASGN bit in status register to all 16 bits of accumulator (acx = 0) or offset accumulator (acx = 1). On chains, the accumulator address is pre incremented causing the sign of the address accumlator to be extended into the next accumlator address. |
| ACCOMP | 16 | Subtract offset accumulator from accumulator (oa = 0) or subtract accumulator from offset accumulator (oa = 1) and store the status of the result into ALU status. Accumulator or offset accumulator original value remains unchanged. |
| Reserved | 17 | N/A |
| Reserved | 18 | N/A |
| Reserved | 19 | N/A |
| TASV | 20 | Transfer accumulator (oa = 0) or offset accumulator (oa = 1) to SV register. Transfer status is modified. |
| TAPH | 21 | Transfer accumulator (oa = 0) or offset accumulator (oa = 1) to PH register. Transfer status is modified. |
| TAMR | 22 | Transfer accumulator (oa = 0) or offset accumulator (oa = 1) to MR register in the signed multiplier mode (UM bit in status register set to 0). Transfer status is modified. |
| TAMRU | 23 | Transfer accumulator (oa = 0) or offset accumulator (oa = 1) MR register in the unsigned multiplier mode (UM bit set to 1). Transfer status is modified. |
| MPACsL | 24 | Multiply MR register by accumulator (oa = 1) or offset accumulator (oa = 0), subtract lower 16 bits of product from offset accum. (oa = 1) or accum. (oa = 0) and store to accum. (acx = 0) or offset (acx = 1). Latch upper 16 bits in PH. ALU status modified. |
| MPACaL | 25 | Multiply MR register by accumulator (oa = 1) or offset accumulator (oa = 0), add lower 16 bits of product to offset accum. (oa = 1) or accum. (oa = 0) and store to accum. (acx = 0) or offset (acx = 1). Latch upper 16 bits in PH. ALU status modified. |
| BSACtL | 26 | Barrel Shift the accum. (oa = 1) or offset (oa = 0) value n bits left (SV reg). Store the upper 16 bits of the 32 bit shift result to PH (msbs ext by XM mode bit). Transfer the lower 16 bits to accumulator (acx = 0) or offset (ascx = 1). ALU status modified. |
| MPACtL | 27 | Multiply MR register by accumulator (oa = 1) or offset (oa = 0), transfer lower 16 bits of product to accumulator (acx = 0) or offset accumulator (acx = 1). Latch upper 16 bits of Product to PH register. ALU status modified. |
| BSACsL | 28 | Barrel Shift the accum (oa = 1) or offset (oa = 0) value n bits left (SV reg). Store the upper 16 bits to PH. Subtract the lower 16 bits of value from offset (oa = 1) or accum. (oa = 0) and store in accum (acx = 0) or offset (acx = 1). ALU status modified. |

-continued

| INST | OP | DESCRIPTION |
|------|----|-------------|
| BSACaL | 29 | Barrel Shift the accum (oa = 1) or offset (oa = 0) value n bits left (SV reg). Store the upper 16 bits to PH. Add the lower 16 bits of value to offset (oa = 1) or accum. (oa = 0) and store in accum (acx = 0) or offset (acx = 1). ALU status modified. |
| MPACR | 30 | Multiply MR register by accumulator (oa = 1) or offset accumulator (oa = 0) and latch the rounded upper 16 bits of the resulting product into the PH register. |
| BSAC | 31 | Barrel Shift the accumulator (oa = 1) or offset accumulator (oa = 0) value n bits left (n stored in SV register). Store the upper 16 bits of the 32 bit shift result to PH. |

These instructions have a special 1 word chain operations when chain mode is selected. The instructions ignore the chain count, executing only once but maintains the carry and comparison to zero operation of the previous arithmetic operation as if the sequence of the previous chain instruction and this instruction execution was a part of a larger chain operation.

Address Register/Memory Reference (Class 4)

Class 4 instructions operate on the register file that exist in the address unit (ADU). Even though the last three registers (R5–R7) have special usage (INDEX,PAGE, and PCSTK), class 4 instruction uniformly apply to all registers. The first 4a sub class provide transfers to and from memory. In indirect mode of memory address reference, any one auxiliary register can serve as the address for loading and storing the contents of another.

Sub class 4b instructions provide some basic arithmetic operations between referenced auxiliary register and short 8 bit constants from program memory. These instructions are included to provide efficient single cycle instructions for loop control and for software addressing routines.

Subclass 4c provide basic arithmetic operations between referenced auxiliary register and 16 bit constants from program memory. These instruction require 2 instruction cycles to execute.

Also a compare to INDEX is provided for efficient loop control where the final loop counter value is not chosen to be. zero.

Class 4a instruction definitions - Rx/Memory

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | 1 | 1 | 1 | 0 | 0 | R | R | R | am | am | am | rx | rx | rx | pm | pm |

| INST | OP | DESCRIPTION |
|------|----|-------------|
| SRx | 0 | Store Rx register to memory. Modify transfer status. |

-continued

| INST | OP | DESCRIPTION |
|------|----|-------------|
| LRx | 1 | Load Rx with the value in memory. Modify transfer status. |

Class 4b instruction definitions -- Rx/Short Constants

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | 0 | 1 | 1 |    |    | k4 | k3 | k2 | k7 | k6 | k5 | R | R | R | k1 | k0 |

| INST | OP | DESCRIPTION |
|------|----|-------------|
| ARxSK | 0 | Add 8 bit positive constant to Rx register. Modify RX status. |
| SRxSK | 1 | Subtract 8 bit positive constant from Rx register. Modify RX status. |
| LRxSK | 2 | Load Rx with the an 8 bit positive constant. Modify RX status. |
| CMRxSK | 3 | Store the status of the subtraction (Rx − 8 bit positive constant) into RXEQ0 and RXCOUT bits of the ST register. Rx remains unchanged. |

Class 4c instruction definitions -- Rx/Long Constant,Misc

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | 1 | 1 | 1 | 1 | 1 | 1 | 0 | 0 | 0 |   | R | R | R | x | x |   |

| INST | OP | DESCRIPTION |
|------|----|-------------|
| ARxLK | 0 | Add 16 bit constant to Rx register. Modify RX status. |
| SRxLK | 1 | Subtract 16 bit constant from Rx register. Modify RX status. |
| LRxLK | 2 | Load Rx with a 16 bit constant. Modify RX status. |
| CMRxLK | 3 | Store the status of the subtraction (Rx − 16 bit constant) into RXEQ0 and RXCOUT bits of the ST register. Rx value remains unchanged. |

Class 4d instruction definitions -- Rx/Long Constant,Misc

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | 1 | 1 | 1 | 1 | 1 | 1 | 0 | 0 | 1 |   | R | R | R | x | x |   |

| INST | OP | DESCRIPTION |
|---|---|---|
| ARx5 | 4 | Add R5 to Rx register. Modify RX status. |
| SRx5 | 1 | Subtract R5 from Rx register. Modify RX status. |
| LRx5 | 2 | Load Rx with R5. Modify RX status. |
| CMRx5 | 3 | Store the status of the subtraction (Rx − R5) into RXEQ0 and RXCOUT bits of the ST register. Both Rx and R5 remain unchanged. |

Memory Reference Instructions (Class 5)

Class 5 instructions provide transfer to/from data memory and all registers (except Accumulator and Rx which is provided by class 1 and 4). The registers referenced for both read and write operations are the multiplier register (MR), Product High register (PH), shift value register (SV), Status register (ST), Top of Stack (TOS), Chain register (STG), and, the four accumulator pointer registers (ACP(3–0)). The data pointer register (DP) is read only since its value is established by lookup table instructions. Repeat N (RPTN) instruction is write only since repeated instructions cannot be interrupted. RETI and RETN instructions are read only operations for poping the stack and are included in this class because the stack is memory mapped. Also included in this class are 4 flag instructions that modify flag memory and two that multiply memory by MR, storing results to PH register.

Class 5 instruction definitions -- General Memory reference

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | 1 | 0 | 1 |   |   |   |   |   | am | am | am | rx | rx | rx | pm | pm |

| INST | OP | DESCRIPTION |
|---|---|---|
| SSV | 0 | Store SV register contents to memory, zero filled upper 12 bits. Transfer status modified. |
| SPH | 1 | Store PH register contents to memory. Transfer status |
| SST | 2 | Store Status (ST) register contents to memory (17 bits including MTAG). No modification of status. |
| SSTG | 3 | Store Chain (STG) register contents to memory, zero filled on upper 8 bits. Transfer status modified. |
| SAP0 | 4 | Store accumlator pointer (ap) register 0 to memory zero filled on upper 10 bits. Transfer status modified. |
| SAP1 | 5 | Store accumlator pointer (ap) register 1 to memory zero filled on upper 10 bits. Transfer status modified. |
| SAP2 | 6 | Store accumlator pointer (ap) register 2 to memory zero filled on upper 10 bits. Transfer status modified. |
| SAP3 | 7 | Store accumlator pointer (ap) register 3 to memory zero filled on upper 10 bits. Transfer status modified. |
| SMR | 8 | Store Multiplier (MR) register contents to memory. Transfer status modified. |
| SDP | 10 | Store Data Pointer (DP) register contents to memory. Transfer status modified. |
| STOS | 11 | Store top of stack (TOS) register contents to memory. Transfer status modified. |
| STAG1 | 12 | Store 1 to memory flag location. |
| STAG0 | 13 | Store 0 to memory flag location. |
| SF1TA | 14 | Store TF1 status bit to memory flag location |
| SF2TA | 15 | Store TF2 status bit to memory flag location |
| LSV | 16 | Load Shift Value (SV) register with memory value. Transfer status modified. |
| LPH | 17 | Load Product High (PH) register with memory value. Transfer status modified. |
| LTOS | 18 | Load top of stack (TOS) register contents to memory |
| LSTG | 19 | Load Chain (STG) register with memory value. Only lower 8 bits are loaded. Transfer status modified. |
| LAP0 | 20 | Load lower 6 bits of memory value to accumlator pointer (ap) register 0. Transfer status modified (16 bit value). |
| LAP1 | 21 | Load lower 6 bits of memory value to accumlator pointer (ap) register 1. Transfer status modified (16 bit value). |
| LAP2 | 22 | Load lower 6 bits of memory value to accumlator pointer (ap) register 2. Transfer status modified (16 bit value). |
| LAP3 | 23 | Load lower 6 bits of memory value to accumlator pointer (ap) register 3. Transfer status modified (16 bit value). |
| LMR | 24 | Load Multiplier (MR) register with memory value and set the multiplier signed mode (UM = 0 in ST register). Transfer status modified. |
| LUMR | 25 | Load Multiplier (MR) register with memory value and set the multiplier unsigned mode (UM = 1 in ST register). Transfer status modified. |
| MPR | 26 | Multiply MR register by referenced memory location, add 00008000 to the 32 bit product to produce a rounding on the upper 16 bits. Store the upper rounded 16 bits to the PH register. No status change. |
| MP | 27 | Multiply MR register by referenced memory location and store the most significant 16 bits of product into the PH register. No status change. |
| RETN | 28 | Return from subroutine. Load memory value addressed by PCSTK register (R7) to program counter. |
| RETI | 29 | Return from interrupt routine. Load memory value addressed by PCSTK register (R7) to program counter. |
| RPTN | 30 | Load repeat counter with lower 8 bits of memory |
| LST | 31 | Load Status (ST) register with memory value (17 bits with MTAG). |

Other features and details which are also contemplated for use in the preferred embodiments, but which are not necessary for practice of the claimed inventions, are disclosed in the following co-pending applications:

U.S. patent application Ser. No. 099/322,800 filed May 28, 1999, claiming priority from U.S. Provisional Application No. 60/090,668 filed Jun. 25, 1998 —"Method for Insuring Security of Program Data in One-Time Programmable Memory," now U.S. Pat. No. 6,160,734 issued Dec. 12, 2002;

U.S. patent application Ser. No. 09/305,891 filed May 5, 1999, claiming priority from U.S. Provisional Application No. 60/090,670 filed Jun. 25, 1998 —"Variable Word Length Data Memory"; and U.S. patent application Ser. No. 099/334,995 filed Jun. 17, 1999, claiming priority from U.S. Provisional Application No. 60/090,589 filed Jun. 25, 1998 —"Low Cost Multiplier Block with Chain Capability"; and All of these are commonly owned with the present application, and have effective filing dates which are simultaneous with that of the present application, and are herein incorporated by reference.

Telephone Answering Machine

Figure 6:
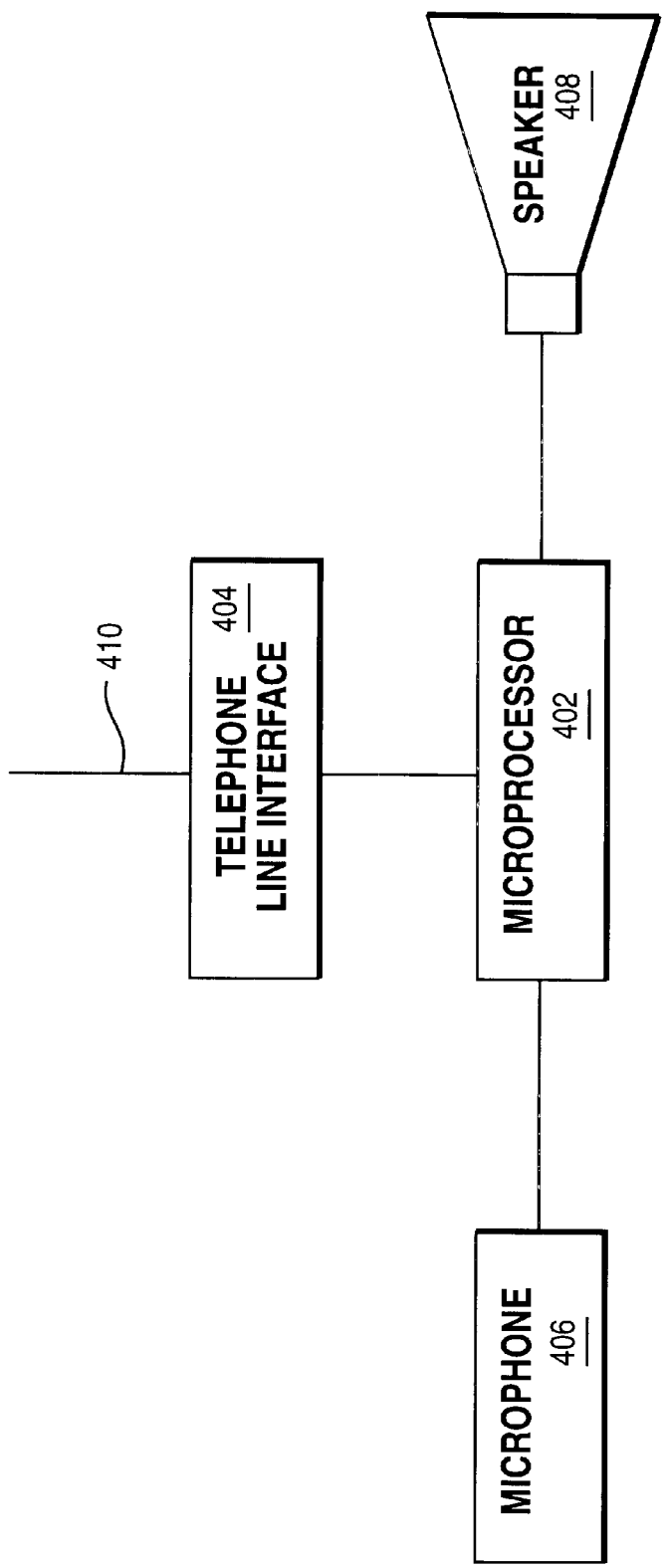
FIG. 6 shows a telephone answering machine incorporating a processor according to the preferred embodiment.

The variable length data memory, and the microprocessor in which it is incorporated, are designed for use in consumer electronics, such as telephone answering machines. A block diagram of an answering machine incorporating this invention is shown in FIG. 6. In this device, the processor 402, which is a processor according the preferred embodiment, is operatively connected to a telephone line interface 404, a microphone 406, and a speaker 408. The microprocessor 402 receives and transmits sound data over the telephone line 410 via the telephone line interface 404. The microprocessor is also able to transmit sound data into the surrounding area via the speaker 408, and receive sound data from the surrounding area via the microphone 406.

According to a disclosed class of innovative embodiments, there is provided a digital signal processor comprising: a digital multiplier having at least one input and an output; a multiplier-register for holding a multiplicand word and connected to provide said multiplicand word to said input of said multiplier; a data memory for holding a first word-chain operand and connected to provide said first word-chain operand to said input of said multiplier; an arithmetic logic unit having an output and an input connected to said output of said multiplier; an accumulator for holding a second word-chain operand and connected to provide said second word-chain operand to said input means of said arithmetic logic unit, having an input connected to said output of said arithmetic logic unit; wherein said data memory holds the plurality N of digital words, said N words being stored therein with a least-significant-word thereof stored at an address location A and with a most-significant-word thereof stored at an address location A+N−1; and wherein said accumulator holds the plurality M of digital words, said M words being stored therein with a least-significant-word thereof stored at an address location B and with a most-significant-word thereof stored at an address location B+M−1.

According to another disclosed class of innovative embodiments, there is provided a processor wherein said counter circuit includes: a first memory access circuit containing a data memory address that points to said least-significant-word of said first word-chain and a counter containing said number N, said first memory access circuit being initially operable to access said data memory at said address that points to said least-significant-word of said first word-chain, and to thereafter sequentially access said data memory at addresses that are incremented N times from said address that points to said least-significant-word of said first word-chain; a second memory access circuit containing an accumulator address that points to said least-significant-word of said second word-chain and counter means containing said number M, said second memory access circuit being initially operable to access said accumulator at said address that points to said least-significant-word of said second word-chain, and to thereafter sequentially access said accumulator at addresses that are incremented M times from said address that points to said least-significant-word of said second word-chain.

According to another disclosed class of innovative embodiments, there is provided a computing processor comprising: a multiplier having input means and output means; a multiplier-register for holding a first operand and connected to provide said first operand to said input means of said multiplier; a data memory for holding a first word-chain operand and connected to provide said first word-chain operand to said input means of said multiplier; an arithmetic logic unit having output means and having input means connected to said output means of said multiplier; an accumulator for holding a second word-chain operand and connected to provide said second word-chain operand to said input means of said arithmetic logic unit; and means connecting said output means of said arithmetic logic unit to said input means of said accumulator.

According to another disclosed class of innovative embodiments, there is provided a processor comprising: a multiplier having an input and an output; an input register for holding a multiplicand word and connected to provide said first operand to said input of said multiplier; a memory for holding a first word-chain operand and connected to provide said first word-chain operand to said input of said multiplier; an arithmetic logic unit having an output and having an input connected to said output of said multiplier; an accumulator for holding a second word-chain operand and connected to provide said second word-chain operand to said input of said arithmetic logic unit; and wherein said output of said arithmetic logic unit is operatively connected to said input of said accumulator; wherein successive second word-chain operands are stored at successive locations in said accumulator.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

It should also be noted that, over time, an increasing number of functions tend to be combined into a single chip. The disclosed inventions can still be advantageous even with different allocations of functions among chips, as long as the functional principles of operation described above are still observed.

What is claimed is:

1. A digital signal processor comprising:

a digital multiplier having two inputs and an output;

a multiplier-register for holding a multiplicand word and connected to provide said multiplicand word to said input of said multiplier;

a data memory for holding a first word-chain operand and connected to provide said first word-chain operand to said input of said multiplier;

an arithmetic logic unit having an output, first input connected to said output of said multiplier and a second input;

an accumulator for holding a second word-chain operand and connected to provide said second word-chain operand to said second input of said arithmetic logic unit, having an input connected to said output of said arithmetic logic unit;

wherein said data memory holds the plurality N of digital words, said N words being stored therein with a least-significant-word thereof stored at an address location A and with a most-significant-word thereof stored at an address location A+N−1; and wherein said accumulator holds the plurality M of digital words, said M words being stored therein with a least-significant-word thereof stored at an address location B and with a most-significant-word thereof stored at an address location B+M−1.

2. The computing processor of claim 1, wherein said accumulator comprises a first and a second set of registers, with said, second word-chain being stored in said first set of registers, and with said second set of registers being connected to said output means of said arithmetic logic unit.

3. The processor of claim 1, further comprising a counter circuit associated with said data memory and with said accumulator and operable to sequentially access said first and second word-chains respectively from said least-significant-word to said most-significant word.

4. The processor of claim 3, wherein said counter circuit includes:
- a first memory access circuit containing a data memory address that points to said least-significant-word of said first word-chain and a counter containing said number N,
- said first memory access circuit being initially operable to access said data memory at said address that points to said least-significant-word of said first word-chain, and to thereafter sequentially access said data memory at addresses that are incremented N times from said address that points to said least-significant-word of said first word-chain;
- a second memory access circuit containing an accumulator address that points to said least-significant-word of said second word-chain and counter means containing said number M,
- said second memory access circuit being initially operable to access said accumulator at said address that points to said least-significant-word of said second word-chain, and to thereafter sequentially access said accumulator at addresses that are incremented M times from said address that points to said least-significant-word of said second word-chain.

* * * * *